United States Patent
Bohlender et al.

(10) Patent No.: US 7,098,426 B2
(45) Date of Patent: Aug. 29, 2006

(54) ELECTRIC HEATING DEVICE WITH HEATING ZONES

(75) Inventors: Franz Bohlender, Kandel (DE); Maurice Clauss, Nordhause/Frankreich (FR); Michael Niederer, Kapellen-Drusweiler (DE)

(73) Assignee: Catern GmbH & Co. KG, Herxheim Bei Landau (DE)

( * ) Notice: Subject to any disclaimer, the term of this patent is extended or adjusted under 35 U.S.C. 154(b) by 150 days.

(21) Appl. No.: 10/788,192

(22) Filed: Feb. 26, 2004

(65) Prior Publication Data

US 2004/0169027 A1     Sep. 2, 2004

(30) Foreign Application Priority Data

Feb. 28, 2003  (EP) ................... 03004526

(51) Int. Cl.
 *H05B 3/00* (2006.01)
(52) U.S. Cl. ............... 219/202; 219/530; 219/540
(58) Field of Classification Search ........... 219/202, 219/504, 537, 540, 530, 541; 392/347, 355, 392/365
See application file for complete search history.

(56) References Cited

U.S. PATENT DOCUMENTS

2002/0011484 A1*  1/2002  Beetz et al. ............... 219/530

FOREIGN PATENT DOCUMENTS

| DE | 199 33 013 | 2/2001 |
| EP | 1 157 867 | 11/2001 |
| FR | 2 742 384 | 6/1997 |

\* cited by examiner

*Primary Examiner*—Robin Evans
*Assistant Examiner*—Vinod Patel
(74) *Attorney, Agent, or Firm*—Boyle Frederickson Newholm Stein & Gratz S.C.

(57) ABSTRACT

An electric heating device is adapted to be used in particular as an auxiliary electric heating for motor vehicles. The heating device comprises a plurality of PTC heating elements arranged in a plane of said heating device. The PTC heating elements are in electric contact with contact sheets for supplying current thereto and in thermal contact with radiator elements for transferring the heat produced to an air current to be heated. According to the present invention, the PTC heating elements arranged in this plane are adapted to be controlled separately in at least two groups.

36 Claims, 8 Drawing Sheets

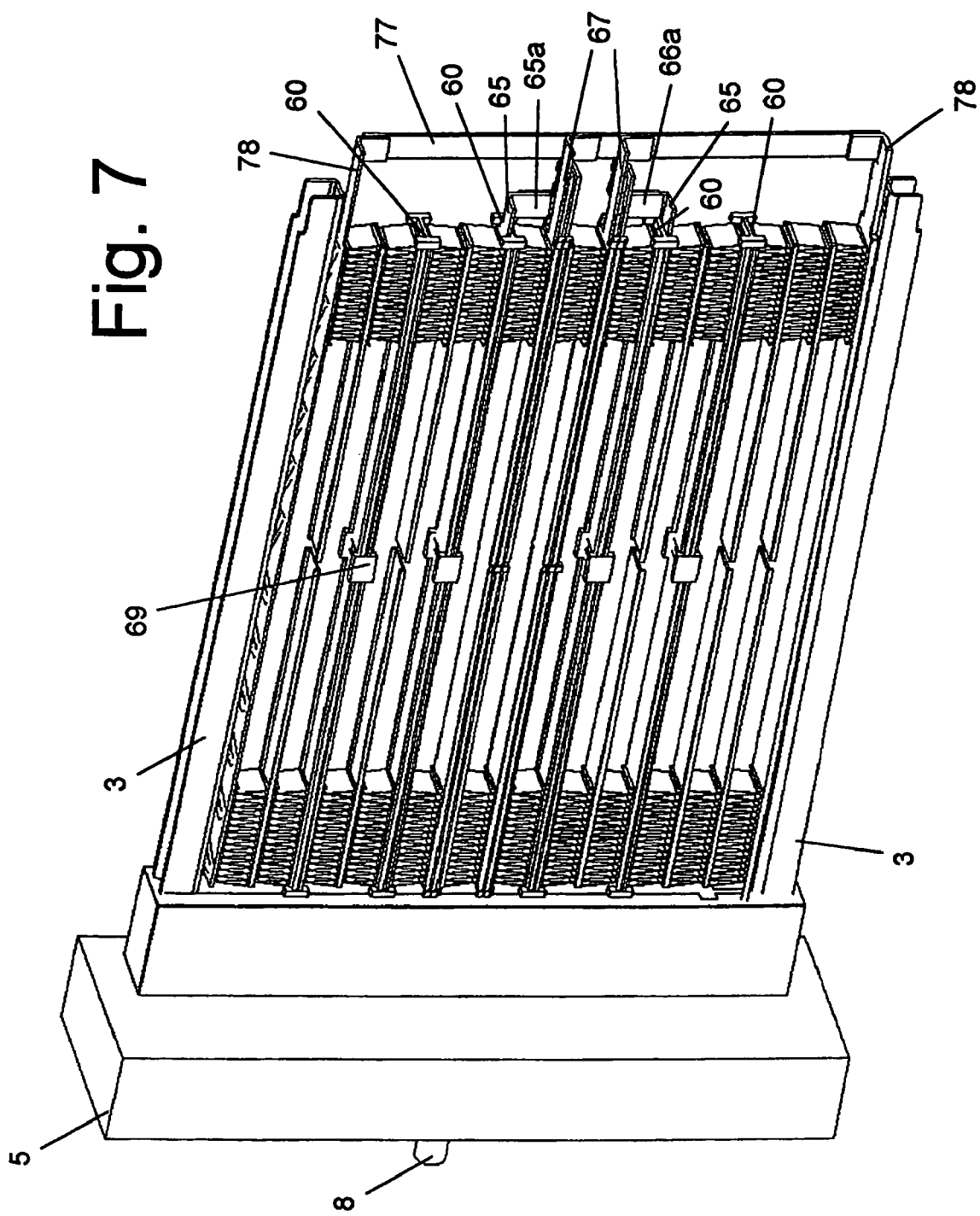

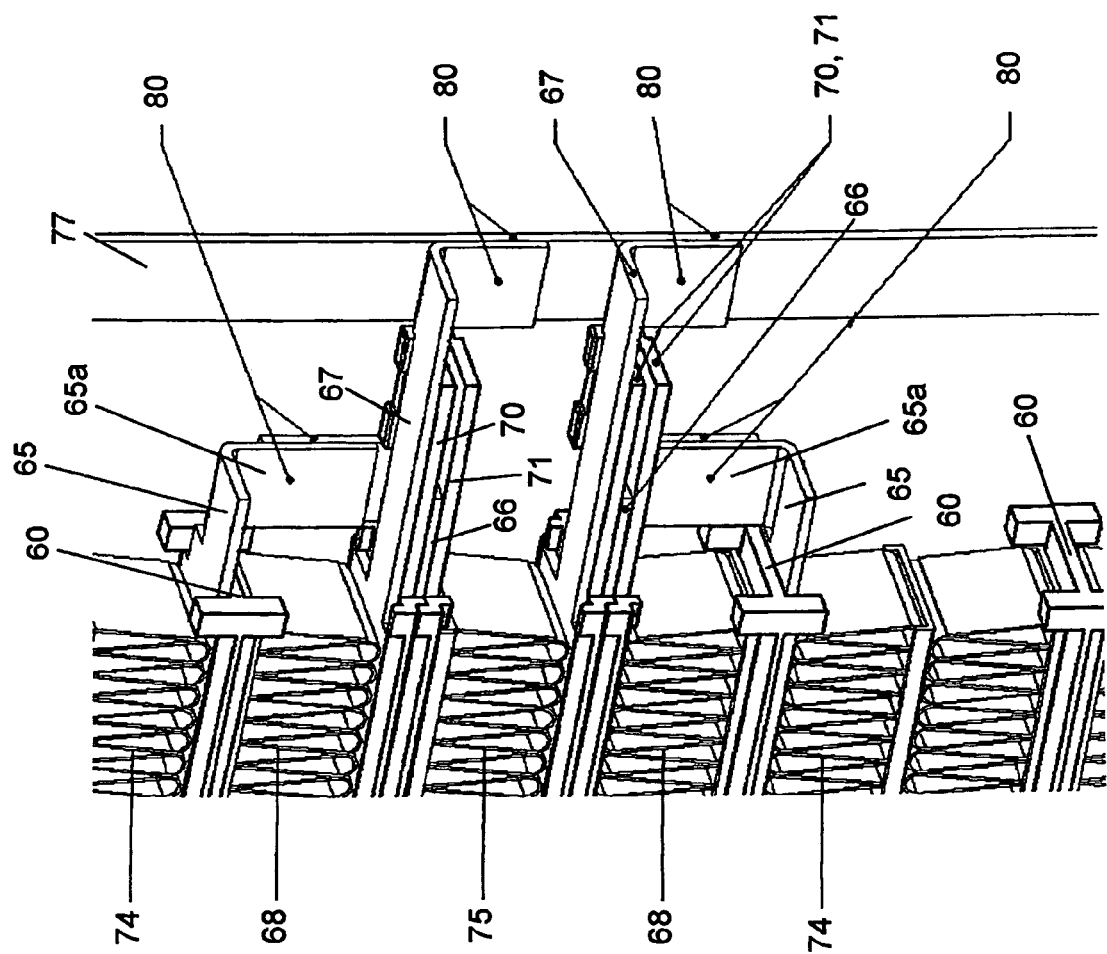

ELECTRIC HEATING DEVICE WITH HEATING ZONES

BACKGROUND OF THE INVENTION

1. Field of the Invention

The invention relates to an electric heating device for motor vehicles. In particular, the invention relates to an electric heating device provided with a heating register which comprises separately controllable heating zones.

2. Description of the Related Art

In motor vehicles, and in particular in motor vehicles with consumption-optimized internal combustion engines, electric heating devices are used for heating the vehicle interior and the engine. Such electric heating devices are, however, also suitable to be used for room air conditioning, for industrial plants, household appliances, etc.

The improved efficiency of consumption-optimized internal combustion engines causes a substantial reduction of the heating power in motor vehicles. When the engine operates in the lower partial-load range and when outside temperatures are low, e.g. in winter, the engine does not supply the amount of heat required for heating the vehicle interior. For compensating such a shortage of heat, auxiliary electric heatings are used, which are normally integrated in air conditioning units of motor vehicles.

A multi-zone air conditioning of the vehicle interior allows every passenger (driver, front passenger, and backseat passengers) to adjust the temperature individually and independently. Additional discharge means direct the air onto the windows of the vehicle for defrosting.

Such multi-zone air conditioning, in the case of which each passenger can adjust the temperature prevailing at his seat separately, is nowadays realized with the aid of water heat exchangers. The percentage of hot air for the air current of each zone can be dosed via a flap control. Conventional electric heating devices (auxiliary heatings) are used for heating the air current in its entirety, i.e. without making a difference between the individual air subcurrents, if the water heat exchanger should fail to provide a sufficient amount of heat.

These conventional auxiliary electric heatings and vehicle air conditioning units are disadvantageous insofar as an individual supply of heat to the respective "zones" cannot be effected separately. An adequate air conditioning for each zone is e.g. only realizable via a suitable flap control (mixing flaps for hot air/cold air) for dosing the amount of heat supplied to each zone. It follows that, when non-uniform amounts of heat are demanded in the individual air conditioning zones of the vehicle, a high percentage of the electric energy is needlessly converted into power, and a fine adjustment of the heating power adapted to each air conditioning zone is not possible, especially not in the case of auxiliary electric heatings having a particularly high heating power (e.g. 2 kW).

OBJECTS AND SUMMARY OF THE INVENTION

It is the object of the present invention to provide an electric heating device by means of which multi-zone air conditioning can easily be realized.

This object is achieved for an electric heating device by the features of the independent claim.

According to the present invention, a plurality of PTC heating elements is arranged in a plane, said PTC heating elements separately controllable in at least two groups. In this way, the amount of heat generated in a heating register comprising only one "heating block" of PTC elements and radiator elements can be dosed separately—without flap control—for neighbouring areas. When the electric heating device in question is provided with a heating register comprising a plurality of such heating blocks, an arbitrary subdivision into heating zones can be realized. 2-zone, 4-zone or even 6-zone air conditioning can easily be realized in this way so that each passenger can adjust the temperature prevailing at his seat individually. The individual temperature preselection for each zone has the effect that a suitable amount of heat is provided only via the respective associated area of the heating register. It follows that, with the aid of the present invention, multi-zone air conditioning can easily be realized by means of an electric heating device. The PTC elements of each zone will only become active when the heating power required necessitates this.

Another advantage of the present invention is to be seen in the fact that the heating device in question has external dimensions which are identical to those of hitherto used heating devices, so that it can be integrated in air conditioning units having a conventional structural design, without any changes being necessary.

Each group of separately controllable PTC heating elements has preferably associated therewith a separate radiator element. This will effectively prevent neighbouring zones from being heated as well.

Each group of separately controllable PTC heating elements is preferably supplied with current via a separate contact sheet, the respective contact sheets being arranged in the same plane. In this way, a separate control can be achieved without any external structural modifications and without restricting the amount of air passing through the unit.

When two groups of separately controllable PTC elements are provided, the respective electric connections for the contact sheets can be arranged on opposed narrow sides. Preferably, the respective electric connections are provided on the same narrow side, the current supply means used for supplying current to the PTC heating elements, which represent the rear PTC heating elements when seen from the connections, extending laterally relative to the front contact sheet. In this way, current can be supplied to both groups of heating elements without any additional restriction of the amount of air passing through the unit. It is not necessary to provide extra construction height for additionally controlling a separate group of PTC heating elements.

The PTC heating elements are preferably held by a positioning frame at predetermined positions in spaced relationship with one another. The positioning frame is preferably also used for positioning the separate contact sheets and/or the radiator elements associated with the individual groups of PTC heating elements. For this purpose the positioning frame is preferably provided with a plurality of projections that protrude beyond the positioning frame. A conventional positioning frame can thus be modified easily for realizing the electric heating device having the structural design according to the present invention. Such a positioning frame does not take up more space than a conventional one so that the amount of air passing through the unit will not be impaired by the additional functionality.

According to another advantageous embodiment of the present invention, the projections are implemented such that the radiator elements can easily be clipped onto the positioning frame. Heating elements comprising PTC heating elements with their respective current supply means, positioning frames and radiator elements can easily be prefabricated in this way. This will keep the manufacturing costs of an electric heating device low.

Each group of PTC heating elements which is separately controllable has preferably associated therewith a control device of its own. This allows a particularly simple realization of multi-zone air conditioning in a motor vehicle in the case of which the heating power required for each zone can be adjusted separately. Each passenger on the front seats or in the rear compartment can, for example, preselect a different temperature so that each zone will provide a different amount of heat.

In addition, the present invention may be implemented such that the air channels of all the heating zones can be united for rapidly defrosting the windows of the vehicle.

According to a special embodiment of the present invention, the group of PTC heating elements which is arranged farther away from the electric connections of the contact sheets comprises a smaller number of PTC heating elements. The width of the contact sheet which supplies current to the rear group of PTC heating elements and which extends laterally relative to the contact sheet for the front group of PTC heating elements can be particularly narrow due to the smaller amount of current. A necessary additional structural depth of the heating device can, in this way, be particularly small or even be avoided completely.

Further advantageous embodiments of the present invention represent the subject matters of the subclaims.

BRIEF DESCRIPTION OF THE DRAWINGS

In the following the present invention will be described making reference to the figures enclosed, in which FIG. 8 shows a view of a detail of the heating device according to FIG. 7, which shows the alternative current supply more clearly.

DETAILED DESCRIPTION OF THE PREFERRED EMBODIMENTS

Figure 1A:
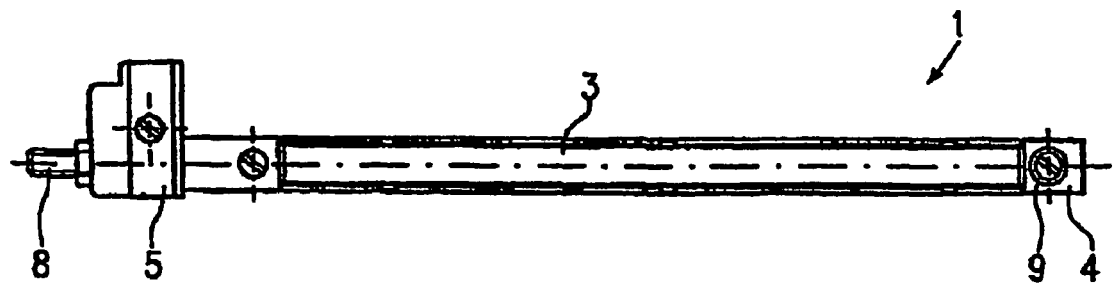
FIG. 1a shows a side view of an electric heating device according to the present invention.
Figure 1B:
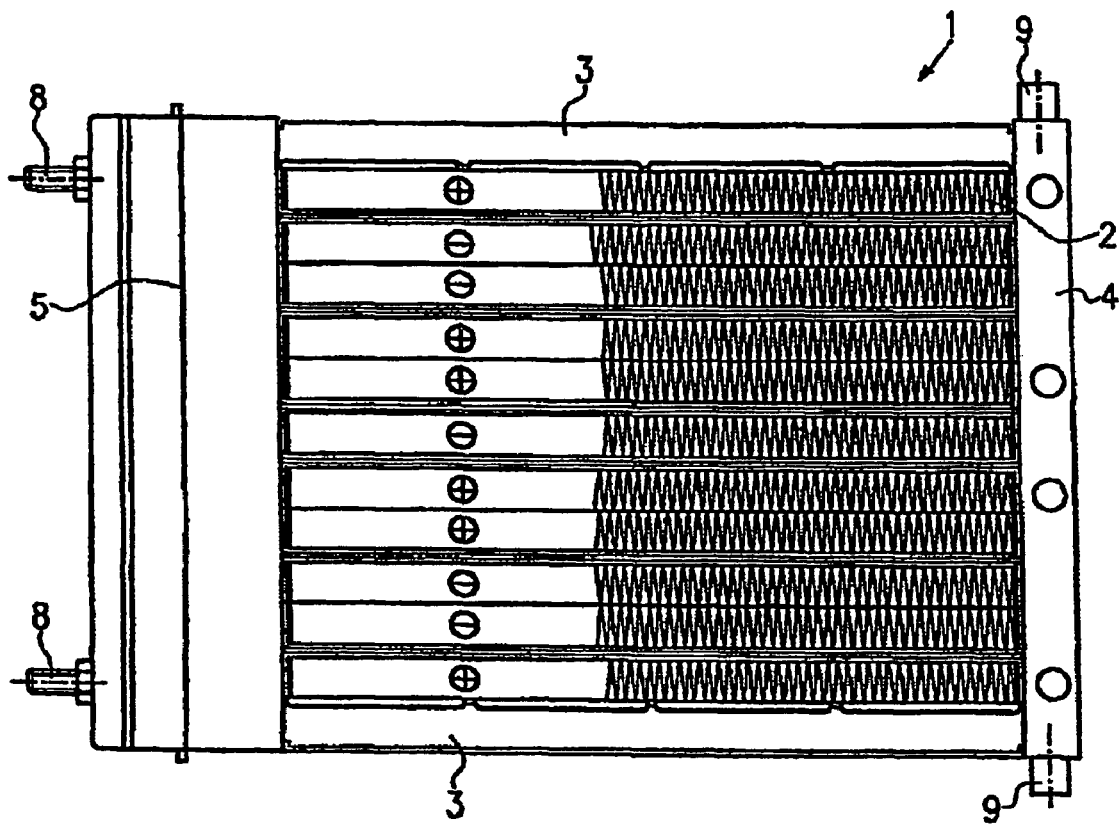
FIG. 1b shows a top view of an electric heating device according to the present invention.

The structural design of an electric heating device, which is adapted to be used especially in motor vehicles, is shown in FIG. 1a and FIG. 1b. Whereas FIG. 1b is a top view of the electric heating device, the view shown in FIG. 1a is a side view. The electric heating device 1 is provided with a heating register comprising a plurality of layered or stacked heating elements. Each heating element comprises at least one resistance heating element and radiator elements or heat conducting sheets arranged adjacent thereto. The elements used as resistance heating elements are preferably PTC heating elements. The heating register is held in a frame comprising opposed longitudinal bars 3 and lateral bars 4 and 5 which are arranged at right angles to these longitudinal bars 3. The frame bars are made of metal or of plastic material.

The longitudinal bars have essentially identical structural designs. The opposed lateral bars 4 and 5, however, differ insofar as the lateral bar 5 is implemented as a box that is open on one side thereof. The opening of this box-shaped lateral bar 5 is located on the side of said lateral bar 5 which faces the heating elements. This box is adapted to have inserted therein a control device which controls the heat output of the individual heating zones by controlling the current supplied. The open side of the lateral bar 5 implemented as a box is closed by a cover which is attached to or clipped onto said lateral bar 5 after insertion of the control device.

The control device is preferably realized as a printed circuit board comprising a plurality of power semiconductor components. After having been inserted in the box-shaped lateral bar 5, the printed circuit board is arranged preferably at right angles to the plane of the frame. The current distributed by the control device among the individual heating zones is supplied via two connecting pins 8. These connecting pins 8 are implemented such that they are easily able to conduct the heating currents required. The lateral bar 5 is additionally provided with a plug base for controlling the control device. For controlling the PCT heating elements, the control device has preferably supplied thereto signals via a motor vehicle bus.

Figure 2:
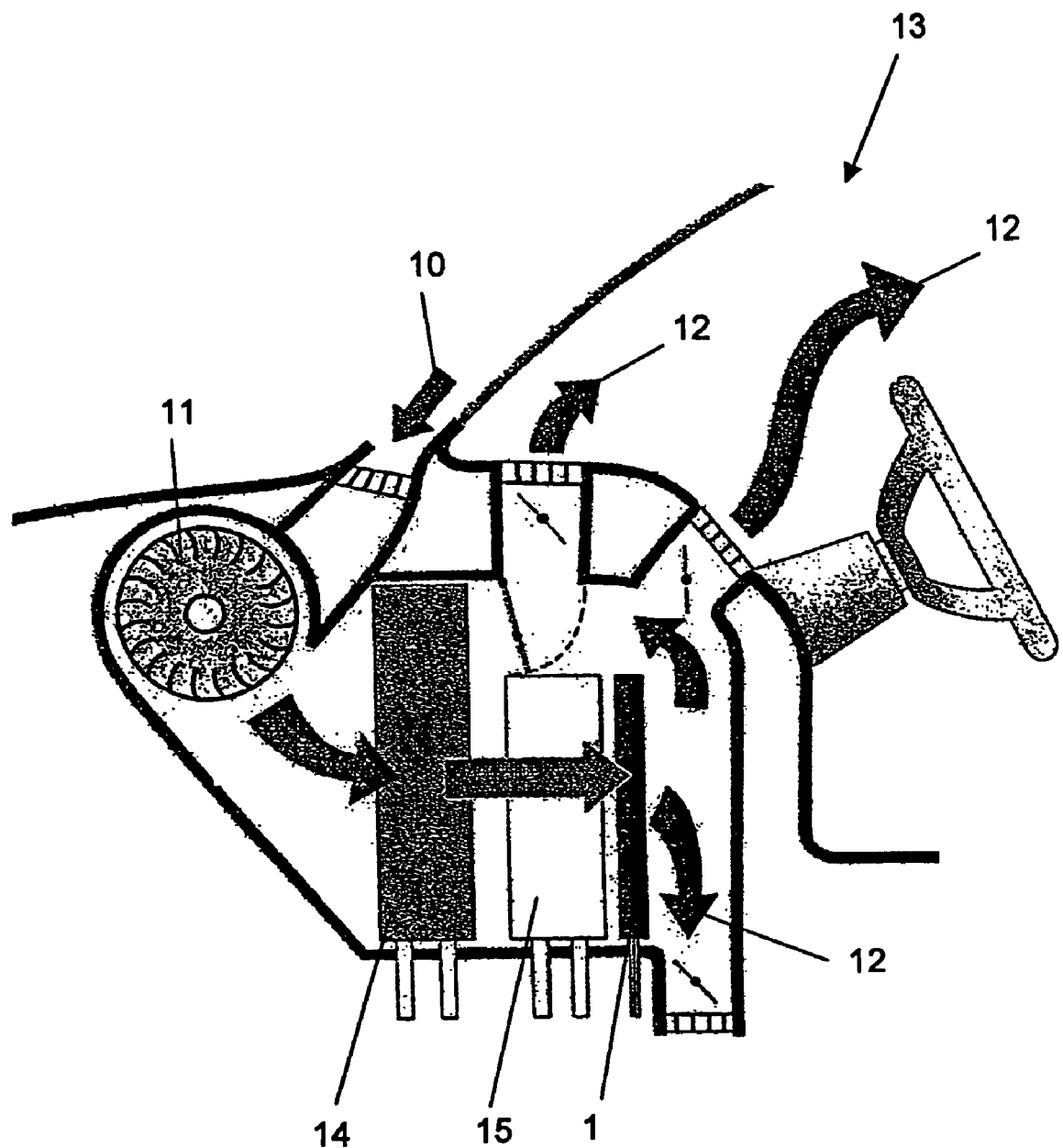
FIG. 2 shows a conventional air conditioning unit installed in a motor vehicle.

The use of electric auxiliary heatings in an air conditioning unit (without multi-zone heating) is shown in FIG. 2. The air conditioning unit takes in outside air 10 via a blower 11, said outside air being supplied to the interior via an electric heating device 1. In the course of this process, the air previously flows through an evaporator 14 and a water heat exchanger 15. Subsequently, the heated air 12 flows via a suitable discharge means into the interior 13 of the vehicle.

For effecting multi-zone air conditioning, the heated air 12 is supplied to predetermined discharge means via a suitable channel system. The air supplied to the discharge means via the channels can therefore be heated individually to specific temperatures.

Figure 3:
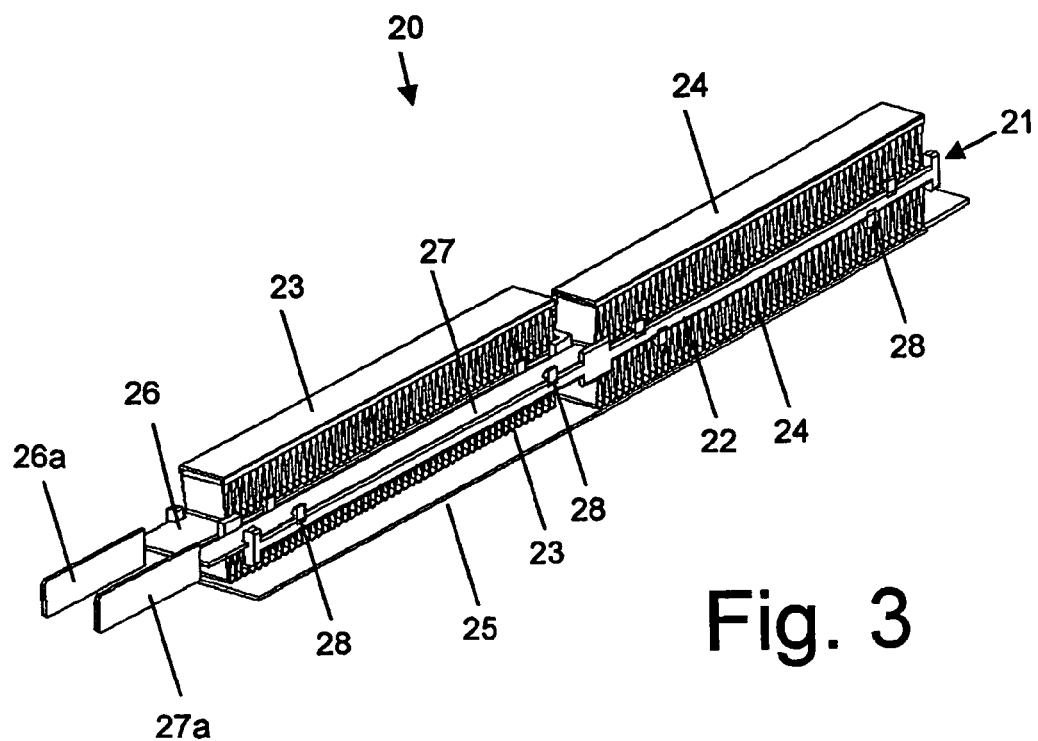
FIG. 3 shows a perspective view of a heating element of the heating register of the heating device according to the present invention.

The heating register of the heating device according to the present invention comprises preferably a plurality of radiator elements and PTC heating elements arranged adjacent thereto. A "basic element" 20 of such a layered structure is shown in FIG. 3. Radiator elements 23, 24 have provided between them a layer 21 with PTC heating elements and current supply means, namely contact sheets 26, 27, associated with said PTC heating elements. The two contact sheets 26, 27, allow a separate control of two groups of PTC heating elements. A further contact sheet 25, which is common to all PTC heating elements, is provided on the lower side of the radiator elements 23, 24. Alternatively, the contact sheet 25 may also be arranged on the side of the positioning frame located opposite to the contact sheets 26, 27.

Figure 4:
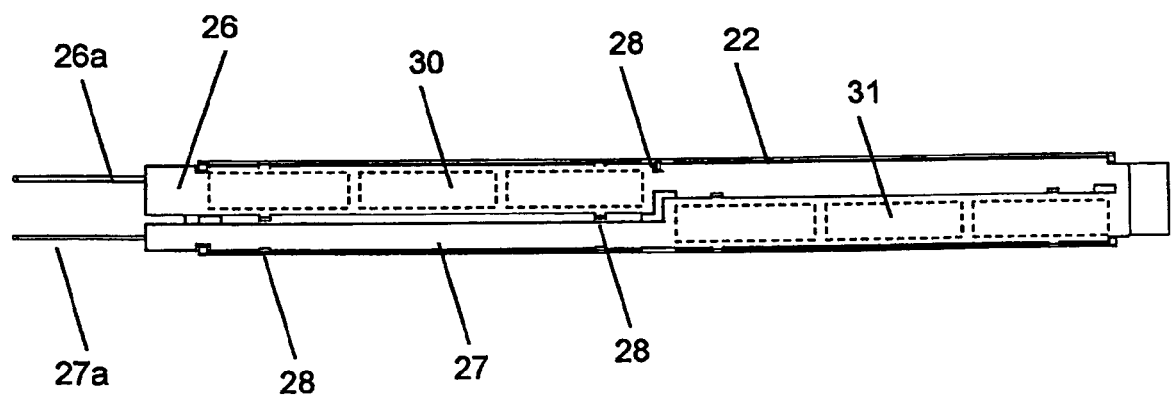
FIG. 4 shows a sectional view through the heating element shown in FIG. 3.

A separate current supply to different groups of PTC heating elements is shown in detail in FIG. 4. A first contact sheet 26 contacts the PTC heating elements 30, which form a first group of PTC heating elements. A second contact sheet 27 supplies current to a second group of PTC heating elements 31. Both contact sheets are provided at one end thereof with electric connections 26a, 27a extending in the longitudinal direction. Via such an arrangement, the groups of PTC heating elements 30, 31, which are arranged one after the other, can be provided with current via a common control device.

For supplying current via connection 27a to the rear group of PTC heating elements 31, the contact sheet 27 extends laterally relative to the contact sheet 26. For this purpose, said contact sheet is preferably implemented such that it is narrower than in the area of the PTC heating elements 31 to be supplied with current.

According to a special embodiment of the present invention, the PTC heating elements 30, 31 are arranged such that they are displaced relative to one another in correspondence with the position of the contact sheets 26, 27. Accordingly, also the radiator elements 23, 24, which are associated with the respective PTC heating elements 30, 31, are preferably arranged such that they are displaced relative to one another. A structural design of this kind is shown in a perspective view in FIG. 3. According to an alternative arrangement, the PTC heating elements and the radiator elements are arranged without displacement.

The PTC heating elements 30, 31 of the first and second groups are held by a common positioning frame 22 at predetermined, spaced-apart positions. The positioning frame 22 is preferably made of plastic material and provided with suitable openings for this purpose. For contacting the PTC heating elements 30, 31, said PTC heating elements are in contact with contact sheets 25, 26, 27 on both sides thereof. Alternatively, the current can also be supplied via intermediate, electrically conductive radiator elements 23, 24.

According to the present invention, the positioning frame is implemented such that at least the contact sheets 26, 27 are also held in spaced-apart relationship on the positioning frame 22. For this purpose, the positioning frame is provided with webs, ribs and projections for precisely positioning the current-carrying elements. The contact sheets 26, 27 are held in spaced relationship with one another by the projections of the positioning frame.

According to a special embodiment of the present invention, the positioning frame is implemented such that also the radiator elements 23, 24 are precisely fixed in position on the positioning frame 22 via the projections 28. The positioning frame 22 is therefore implemented such that at least all the current-carrying elements 23, 24, 26, 27 on the side of the PTC heating elements 30, 31 on which said PTC heating elements 30 31 are supplied with current via separate contact sheets are held by said positioning frame such that they are electrically insulated from one another.

Preferably, also the radiator elements 23, 24, which are located on the opposite side, are held via respective projections 28 of the positioning frame 22 so that they are arranged directly adjacent to the respective PTC heating elements 30, 31 for obtaining a good heat transfer.

According to another special embodiment of the present invention, the projections 28 of the positioning frame 22 are implemented such that the radiator elements 23, 24 can be clipped onto the positioning frame. Such a positioning frame allows a simple production of a heating element 20 of the type shown in FIG. 3, so that the final assembly of an electric heating device according to the present invention can take place in a simple manner via prefabricated heating elements 20.

Figure 5:
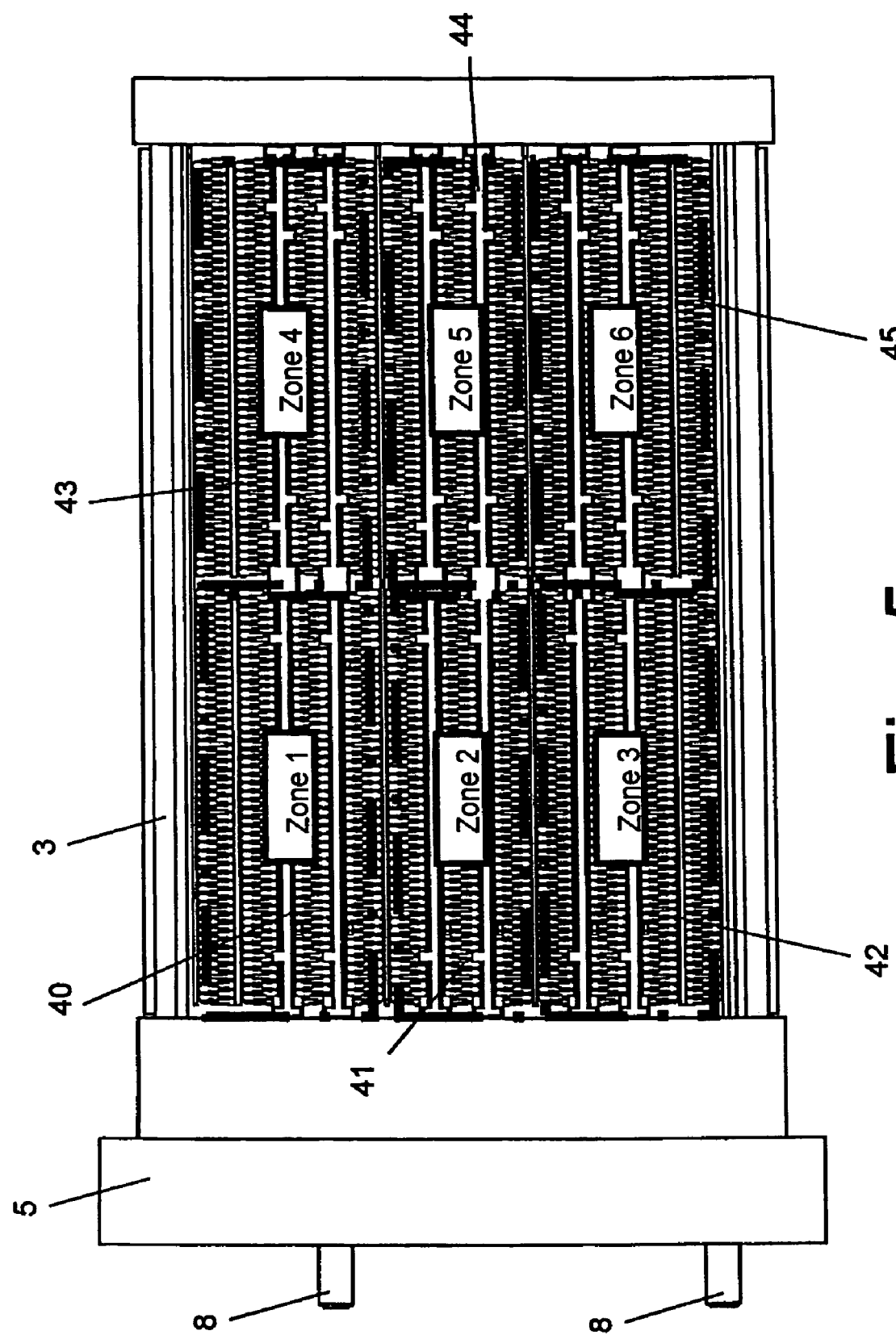
FIG. 5 shows a top view of the electric heating device for multi-zone air conditioning according to the present invention.

A top view of such an electric heating device is shown in FIG. 5. This heating device corresponds to the representation according to FIG. 1b, the individual heating zones for a plurality of possible variants being additionally shown. For this purpose, the heating register is subdivided in the horizontal and in the vertical direction. Each of the heating zones is separately supplied with current via a respective control element, i.e. a respective power transistor of the control unit.

Although the zones 40 to 45 have approximately the same size in FIG. 5, they may also have different structural designs.

A plurality of zones/heating areas of the heating register can be associated with a number of air conditioning zones via respective air channels; said number of air conditioning zones is independent of the number of zones/heating areas and may perhaps differ therefrom. In the case of the subdivision into six zones shown in FIG. 5, two zones may e.g. associated with the driver, two with the front passenger and one with each of the back-seat passengers. In the case of a two-zone air conditioning of the motor vehicle, a symmetric subdivision can be provided, with three zones of the heating register for each air conditioning zone of the vehicle interior. The control device arranged on the end face in the lateral bar 5 is configured as a six-stage control device for this purpose, so that each zone can be controlled separately.

An alternative approach to a supply of current to the second group of PTC heating elements 31 is shown in FIG. 6 to 9. This embodiment differs from the preceding one essentially insofar as the radiator elements and the PTC heating elements of the various heating zones are arranged without being displaced relative to one another. This has the effect that, in spite of a plurality of separately controllable heating zones, the heating device is particularly narrow in size. For this purpose, the current, preferably the positive contact, which is supplied to the group of heating elements 31 representing the rear group when seen from the control device, is supplied via a separate current supply means in a plane other than the plane of the PTC heating elements.

Figure 6A:
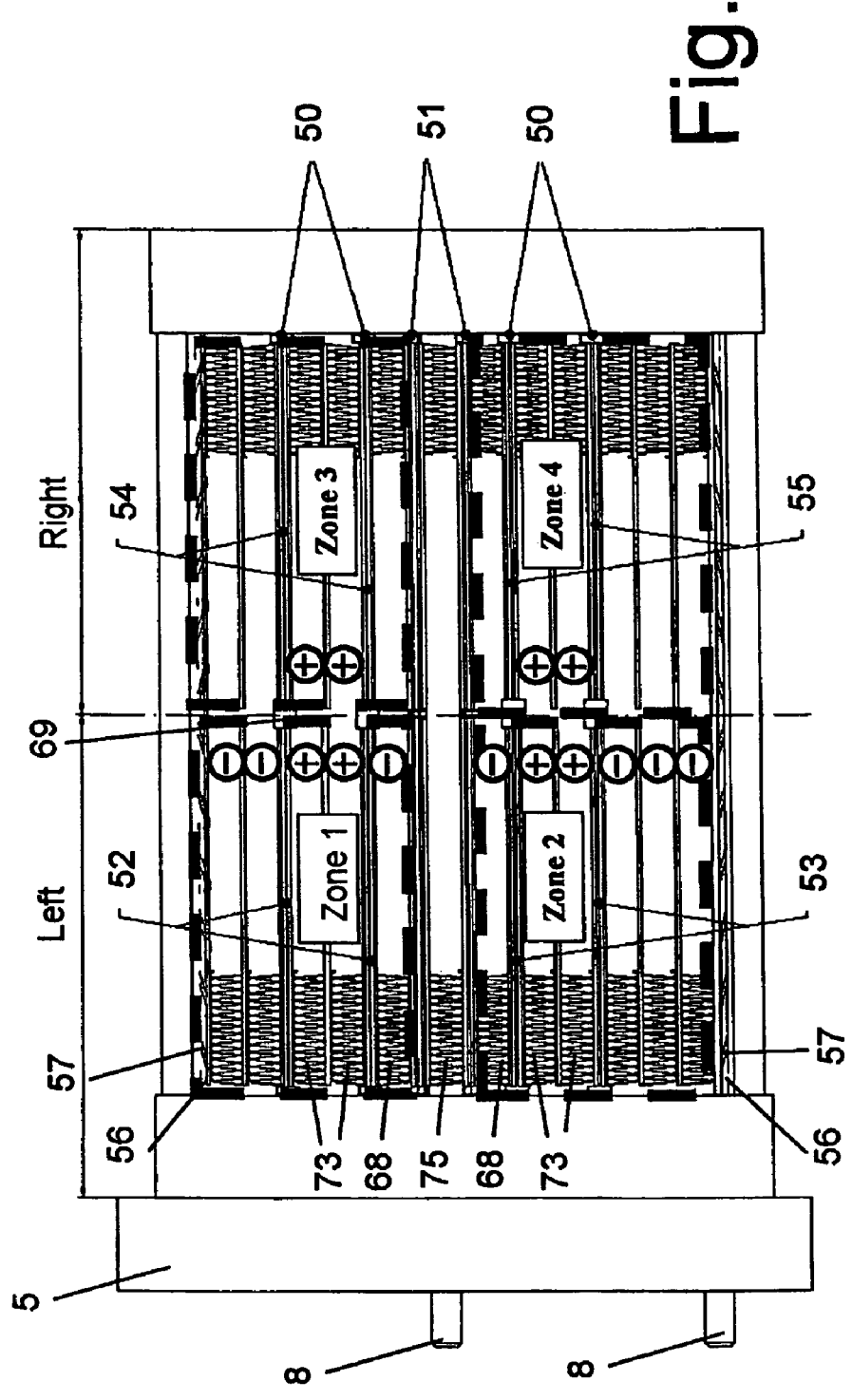
FIG. 6a shows a top view of the electric heating device according to the present invention, used for multi-zone air conditioning in an embodiment which is alternative to that of FIG. 5.

In FIG. 6a, an example for various heating zones 52 to 55 is shown. In these heating zones, planes 50 are arranged in which the PTC heating elements 30, 31 are located. Due to the fact that the PTC heating elements 30, 31 in the left and in the right half of the heating register can be controlled separately, juxtaposed heating zones 52 to 55 can be realized. The current for controlling the PTC heating elements 31 of the right half, which comprises zones 54 and 55, is provided via respective current supply means located in the planes 51.

The arrangement of the planes 50 and 51 shown in the figure is only shown by way of example, and any other arrangement is possible as well. The planes 51 may, for example, also be arranged on the upper and the upper and lower edges of the heating device.

Figure 6B:
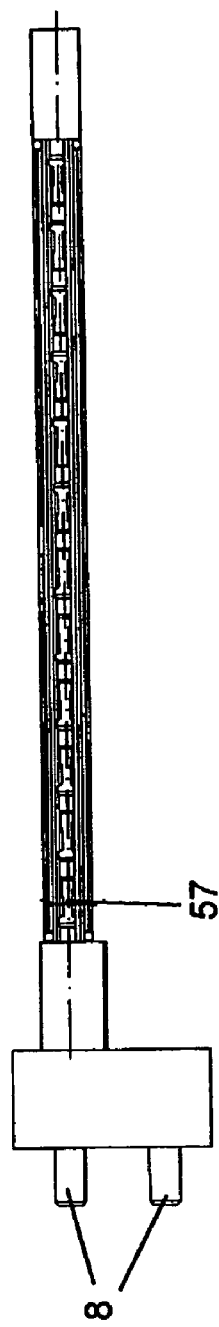
FIG. 6b shows a side view of the electric heating device shown in FIG. 6a, FIG. 7 shows a perspective view of the heating device according to FIG. 6, in said perspective view the elements of the heating device are shown only partly so as to elucidate the principle of the heating device.

The layered structure of PTC heating elements, radiator elements and contact sheets is clampingly pressed together by means of springs 56 comprising individual spring elements 57. In the embodiment shown, suitable springs 56 are provided on the upper and on the lower edge of the arrangement. Alternatively, the contact pressure can also be produced by a single spring 56. As shown in FIG. 6b, the individual spring elements 57 are preferably arranged at positions corresponding to those of the PTC heating elements 30, 31 in the planes 50.

These springs 56 with spring elements 57 are also provided in the previously described embodiments, although this is not shown in the figures in question.

Figure 9:
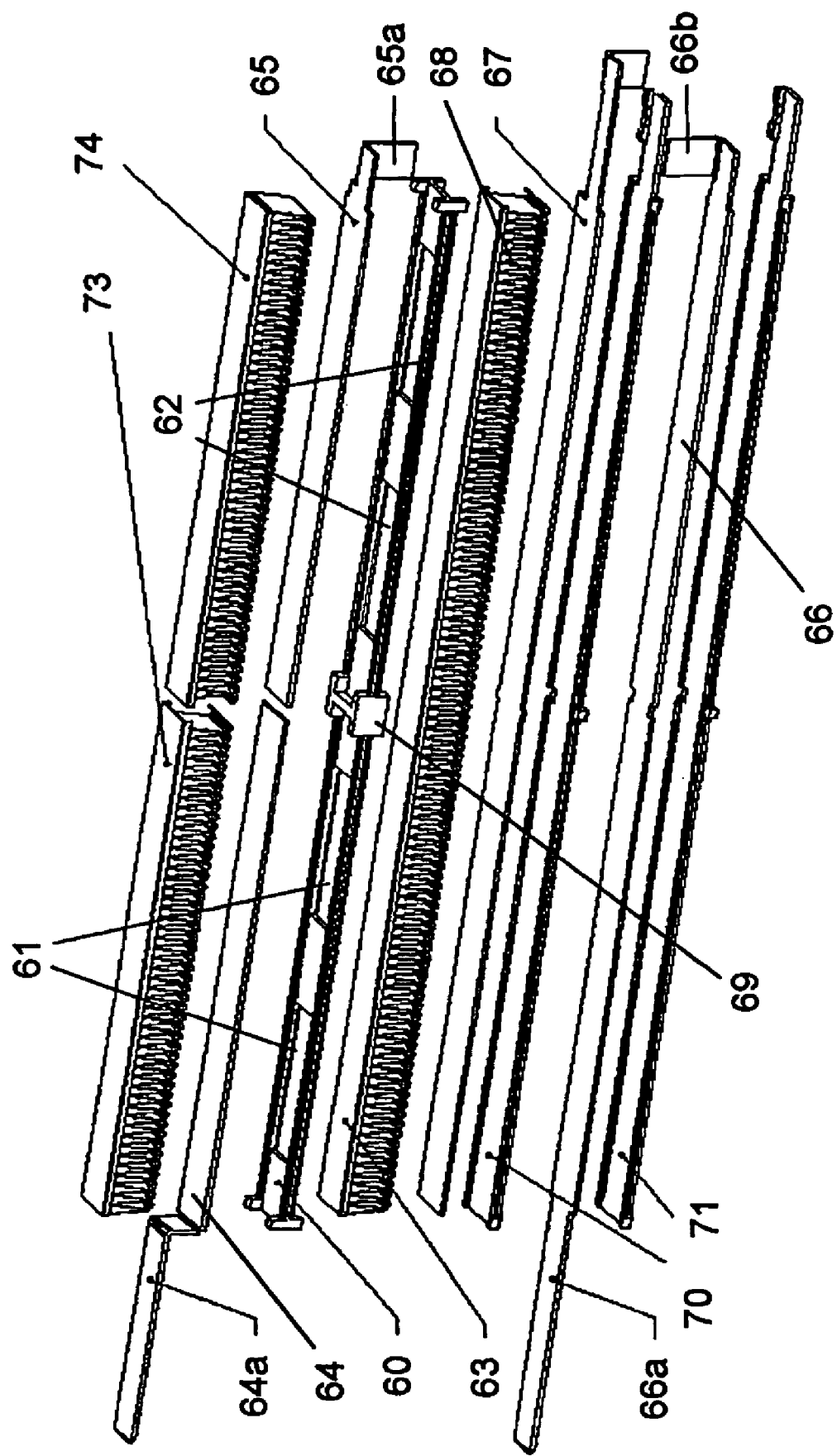
FIG. 9 shows a perspective view of a detail of the heating register of the heating device in the form of an exploded view of the alternative embodiment according to FIG. 6.

A special realization of the alternative embodiment will be described hereinbelow making reference to FIGS. 7, 8 and 9. These figures show a perspective view of the elements of a heating device of the type in question. FIG. 7 shows a general view of an electric heating device of the type in question; in this view, the elements of the heating device have been partly omitted so that the structural principle can be seen more clearly. In particular, the radiator elements are only shown rudimentarily. FIG. 8 shows a particularly relevant detail of this realization and FIG. 9 an exploded view of a heating element of the heating device.

In the planes 50 of FIG. 6, respective positioning frames 60 are arranged, which are provided with openings 61, 62 for the PTC heating elements 30, 31. The PTC heating elements are contacted to ground via a contact sheet 63 on the lower surface thereof. On their upper surfaces both groups of PTC heating elements 30, 31 are contacted separately by positive contact sheets 64, 65.

For a spaced arrangement of these contact sheets, the positioning frames 60 are each provided with a separator 69. This separator 69, which projects vertically beyond the positioning frame, holds not only the contact sheets 64, 65 but preferably also the radiator elements 73, 74 located adjacent to said contact sheets, in spaced relationship with one another.

According to FIG. 7, the control device is arranged in the lateral bar 5. The first group of PTC heating elements 30 has supplied thereto the respective control current via the contact sheet 64 and a connection 64a projecting in the direction of the control device.

Alternatively to the first embodiment with displaced contact sheets, the present embodiment is implemented such that the PTC heating elements 31, which are arranged on the right-hand side of the heating register, have current supplied thereto via the contact sheet 65 and a current supply means 66 arranged in a plane of the heating register which is different from the plane of said contact sheet 65. The current supply means 66 is provided with a connection 66a connected to the control device in the lateral bar 5 and with a connection lug 66b located on the opposite narrow-side end of the heating register. The connection lug 66b projects vertically in the direction of the plane comprising the PTC heating elements. The contact sheet 65 has a complementary connection lug 65a, which projects in the opposite direction towards the current supply means 66. The two connection lugs 65a, 66b are connected to one another, preferably via a welded joint 80.

According to a specially preferred realization, this positive current supply means 66 serves to supply current not only to the PTC heating elements 31 arranged in the openings 62 but, in addition, also to correspondingly arranged PTC heating elements in a further plane that is arranged e.g. above said PTC heating elements 31. For this purpose, the contact sheet 65 (and also the contact sheet 64) are electrically connected to the radiator elements 73, 74 located above said contact sheets so that an electric contact to a further layer of PTC heating elements is established also over several layers of radiator elements. This layer of heating elements has ground supplied thereto from the opposite side via a current supply means 78.

The ground supply means 67, which extends parallel to the positive current supply means 66, connects the contact sheet 63 via the radiator element 68 to ground. The contact sheet 67 is connected to ground preferably not via the control device, but it is connected via a transverse connection/bar 77 to the ground supply means 78 arranged in the vicinity of the frame.

Additional insulating plates 70, 71 are provided so as to allow the positive current supply to be conducted in the planes 51 to the contact sheets 65 via the current supply means 66 and to the ground supply means 67 for all PTC heating elements 30, 31 in the openings 61, 62. The insulating plate 70 insulates the ground supply means 67 and the positive current supply means 66 from one another. The contact sheet 71 insulates the positive current supply means 66 from the radiator element 75 located therebelow.

Via the insulating plate 71, heating zones 53, 55, which are arranged symmetrically with respect to the above-described heating zones, can be arranged in a corresponding manner on the other side of the current-free radiator element 75.

On the basis of the special realization shown in FIG. 6 to 9, the plus and ground association, which is shown in FIG. 6a in the form of the plus and minus signs, is obtained. The radiator element 75 located between the upper and the lower heating zones is contacted neither to ground nor to a positive current supply means via the contact sheets 71 and is therefore current-free. The radiator elements 68 located adjacent thereto are each contacted to the ground supply means 67 and conduct ground to one side of the PTC heating elements 30, 31, without making a difference between the two PTC heating element groups.

The radiator elements 75 and 68, i.e. the radiator elements which are not used for effecting a separate supply of current to the various groups of PTC heating elements (i.e. the radiator elements which are connected to ground or which are current-free), need not be provided separately for the left and right halves of the heating register. These radiator elements are preferably implemented as continuous/one-piece elements. Alternatively, these heating elements can also be provided such that they are separated from one another so as to achieve a better thermal separation of the individual heating zones.

The radiator elements 73, 74 are electrically connected to the contact sheets 64, 65 arranged on the PTC-heating-element side located opposite to the ground supply means, said contact sheets 64, 65 and said radiator elements 73, 74 being arranged adjacent to one another. They supply the current to an additional layer 50 located further above and comprising PTC heating elements of the respective same zone. The further layer 50 comprising PTC heating elements of the same zone is contacted to ground via the radiator elements located above said layer. The respective polarity of the individual radiator elements and their separate arrangement is shown in FIG. 6a in the form of respective plus and minus signs.

It is a special advantage of this embodiment that, in comparison with the first embodiment, it has even more narrow structural dimensions.

Whereas in the case of conventional multi-zone heatings a separate heating device is required for each discharge channel, the present invention allows the use of a single, central heating device producing the necessary heat via separately controllable heating areas. In this way, high air conditioning comfort can easily be achieved in a motor vehicle.

Zones can be formed in the heating register in an arbitrary manner in the longitudinal direction by associating a special number of PTC heating elements with each zone. In the vertical direction, the size of a zone can be adjusted by a variable association of radiator elements.

Summarizing, it can be stated that the present invention relates to an electric heating device, which is especially adapted to be used as an auxiliary electric heating for motor vehicles. The heating device comprises a plurality of PTC heating elements, which are arranged in a plane of the heating device. The PTC heating elements are in electric contact with contact sheets for supplying current thereto and in thermal contact with radiator elements for transferring the heat produced to an air current to be heated. According to the present invention, the PTC heating elements arranged in this plane are adapted to be controlled separately in at least two groups.

Such a heating device, which has dimensions that are identical with those of conventional heating devices and the same efficiency as such devices, has an additional functionality insofar as the heating elements are adapted to be controlled zone-wise.

We claim:

1. An electrical heater for the heating of air in a motor vehicle, comprising:
    a plurality of PTC heating elements arranged in a plane parallel to a direction of airflow through said electrical heater;
    at least one radiator element that dissipates heat generated by said PTC heating elements into air flowing through said electrical heater;
    separate contact sheets that supply current to at least two separately controllable groups of PTC heating elements arranged in said plane; wherein
        said separate contact sheets having electrical connections that supply current to said contact sheets, and wherein
        said electrical connections are arranged on a common same side of said electrical heater with one another.

2. An electric heating device according to claim 1, wherein each of said separately controllable groups of PTC heating elements has associated therewith at least one separate radiator element.

3. An electric heating device according to claim 1, wherein said separately controllable groups of PTC heating elements are connected via a common contact sheet to the positive pole or to ground.

4. An electric heating device according to claim 3, wherein said separate contact sheets are arranged in a spaced relationship with one another in one plane.

5. An electric heating device according to claim 1, wherein said separate contact sheets are arranged in a spaced relationship with one another in one plane.

6. An electric heating device according to claim 1, wherein said connections of said separate contact sheets are arranged on opposed narrow sides of said heating device.

7. An electric heating device according to claim 6, wherein said separate contact sheets are arranged such that they are not displaced relative to one another.

8. An electric heating device according to claim 7, wherein, current is supplied to one of the separate contact sheets from a connection on the narrow side of said heating device, said narrow side being located opposite to said one contact sheet, and wherein current is supplied to said one contact sheet by a current supply device arranged between insulating plates in a second plane in said heating device.

9. An electric heating device according to claim 6, wherein, current is supplied to one of the separate contact sheets from a connection on the narrow side of said heating device, said narrow side being located opposite to said one contact sheet, and wherein current is supplied to said one contact sheet by a current supply device arranged between insulating plates in a second plane in said heating device.

10. An electric heating device according to claim 9, further comprising a radiator element provided between the plane comprising said PTC heating elements and said second plane.

11. An electric heating device according to claim 10, wherein a ground contact sheet is provided between said plane comprising the PTC heating elements and said second plane and supplies, current to both of said separately controllable groups of PTC heating elements.

12. An electric heating device according to claim 1, wherein the connections used for supplying current are respectively provided on the same narrow side of said heating device and that said contact sheet, which is associated with a rear group of PTC heating elements when seen from the connections, and which extends laterally relative to the front contact sheet.

13. An electric heating device according to claim 12, wherein a contact sheet constituting a rear contact sheet when seen from the connections has associated therewith a smaller number of PTC heating elements than another contact sheet.

14. An electric heating device according to claim 1, wherein at least said radiator elements which is in contact with said separate contact sheets is used for supplying current to said separately controllable groups of PTC heating elements.

15. An electric heating device according to claim 1, further comprising a positioning frame which holds said PTC heating elements in a plane in a layered structure of said heating device in a spaced relationship with one another at predetermined positions.

16. An electric heating device according to claim 15, wherein said positioning frame holds said separate contact sheets in a spaced relationship with one another at predetermined positions.

17. An electric heating device according to claim 16, wherein said positioning frame holds said separate radiator elements in a spaced relationship with one another at predetermined positions.

18. An electric heating device according to claim 17, wherein said positioning frame is provided with a plurality of projections which project vertically beyond said positioning frame and which are used for positioning at least one of said separate contact sheets said separate radiator elements.

19. An electric heating device according to claim 18, wherein said projections are implemented such that said radiator elements are adapted to be clipped onto said positioning frame.

20. An electric heating device according to claim 1, wherein at least one of said separately controllable groups of PTC heating elements and separate radiator elements associated with said separately controllable groups of PTC heating elements are arranged such that they are displaced relative to one another.

21. An electric heating device according to claim 1, wherein each of said respective separate contact sheets has associated therewith identical numbers of PTC heating elements.

22. An electric heating device according to claim 1, further comprising a plurality of heating elements which are arranged one on top of the other in a layered structure, each of said heating elements comprising a plane of separately controllable PTC heating elements and contact sheets associated with said PTC heating elements as well as radiator elements.

23. An electric heating device according to claim 1, wherein said layered structure of PTC heating elements, radiator elements and contact sheets is clampingly fixed in one of a housing and a rectangular frame.

24. An electric heating device according to claim 1, wherein, respective juxtaposed, separate heating zones of the heating device are formed through said separate controllability of said groups of PTC heating elements of a plane.

25. An electric heating device according to claim 24, wherein a heating zone is formed from a plurality of heating elements which are arranged one on top of the other in a layered structure.

26. An air conditioning unit for a motor vehicle, comprising an electric heating device according to claim 1.

27. An auxiliary electric heating device for motor vehicles, comprising:
    a plurality of coplanar PTC heating elements arranged parallel to a direction of airflow through said electrical heater;
    at least one radiator element which is in thermal communication with at least one of said PTC heating elements and which dissipates-heat generated by said PTC heating elements to air flowing through said electrical heater;
    contacts sheets each having electrical connections that supply current to the associated contact sheet and that are configured to supply electrical current to said PTC heating elements; and
    wherein said PTC heating elements are separately controllable in at least two groups, wherein each contact sheet supplies current to one of said separately controlled groups of PTC heating elements, and wherein said electrical connections are arranged on a common side of said electrical heater with one another.

28. An electric heating device according to claim 27, wherein each of said separately controllable groups of PTC heating elements has associated therewith at least one separate radiator element.

29. An electric heating device according to claim 27, a separate contact sheet of is configured to supply electrical current to each group of said separately groups of PTC heating elements.

30. An electric heating device according to claim 27, wherein,
    a plurality of said radiator elements are provided, at least some of which are in electrical contact with at least some of said contact sheets, and
    at least the radiator elements which are in contact with said separate contact sheets are configured to supply electrical current to said groups of PTC heating elements.

31. An electric heating device according to claim 27, further comprising a positioning frame which holds said PTC heating elements in a plane in a layered structure in a spaced relationship with respect to one another.

32. An electric heating device according to claim 27, wherein at least one of said separately controllable groups of PTC heating elements and separate radiator elements associated therewith are arranged such that they are displaced relative to one another.

33. An electric heating device according to claim 27, wherein each of said contact sheets has associated therewith identical numbers of PTC heating elements.

34. An electric heating device according to claim 27, further comprising a plurality of heating elements which are arranged one on top of the other in a layered structure, each of said heating elements comprising a plane of separately controllable PTC heating elements and contact sheets associated with said PTC heating elements as well as radiator elements.

35. An electric heating device according to claim 27, wherein, said PTC heating elements, said radiator elements, and said contact sheets are clampingly fixed in one of a housing and a rectangular frame to form a layered structure.

36. An electric heating device according to claim 27, wherein respective juxtaposed, separate heating zones of the heating device are formed through said separate controllability of said groups of coplanar PTC heating elements.

* * * * *